US012594972B2

(12) United States Patent
Ogata et al.

(10) Patent No.: US 12,594,972 B2
(45) Date of Patent: Apr. 7, 2026

(54) RAILWAY VEHICLE

(71) Applicant: Hitachi, Ltd., Tokyo (JP)

(72) Inventors: Hiromu Ogata, Tokyo (JP); Takahisa Yamamoto, Tokyo (JP); Tadashi Fujii, Aichi (JP)

(73) Assignee: HITACHI, LTD., Tokyo (JP)

( * ) Notice: Subject to any disclaimer, the term of this patent is extended or adjusted under 35 U.S.C. 154(b) by 691 days.

(21) Appl. No.: 18/079,967

(22) Filed: Dec. 13, 2022

(65) Prior Publication Data

US 2023/0211813 A1 Jul. 6, 2023

(30) Foreign Application Priority Data

Jan. 5, 2022 (JP) ................................. 2022-000530

(51) Int. Cl.
*B61D 19/00* (2006.01)
*B60R 21/21* (2011.01)
*B61D 19/02* (2006.01)

(52) U.S. Cl.
CPC ............ *B61D 19/004* (2013.01); *B60R 21/21* (2013.01); *B61D 19/02* (2013.01); *B60Y 2200/33* (2013.01)

(58) Field of Classification Search
CPC ...... B61D 19/02; B61D 19/004; B60R 21/21; B60Y 2200/33
See application file for complete search history.

(56) References Cited

U.S. PATENT DOCUMENTS

2019/0112868 A1 4/2019 Deaver

FOREIGN PATENT DOCUMENTS

| EP | 1 280 690 B1 | 12/2005 | |
| JP | 4673091 B2 * | 4/2011 | ............. B61D 19/02 |
| JP | 2018-140648 A | 9/2018 | |

OTHER PUBLICATIONS

Taiwanese Office Action received in corresponding Taiwanese Application No. 111148439 dated Sep. 8, 2023.

* cited by examiner

*Primary Examiner* — Robert J McCarry, Jr.
(74) *Attorney, Agent, or Firm* — MATTINGLY & MALUR, PC

(57) ABSTRACT

Provided is a railway vehicle capable of constructing a highly reliable seal for a side hinged door with a small number of manufacturing steps. The railway vehicle includes: a side structure 20; an opening portion 10 provided in the side structure 20; a side hinged door 12 configured to close the opening portion 10; a door pillar 22 provided on a vehicle interior side of a peripheral edge portion of opening portion 10; a retainer 24 provided on the door pillar 22; and an expandable seal rubber 25 gripped by the retainer 24 and expanded by pumped air. The retainer 24 includes a seal damming portion 24a that protrudes toward the opening portion 10.

7 Claims, 5 Drawing Sheets

RAILWAY VEHICLE

CROSS-REFERENCE TO RELATED APPLICATIONS

The present application claims priority to Japanese Patent Application No. 2022-000530, filed Jan. 5, 2022. The contents of this application are incorporated herein by reference in their entirety.

TECHNICAL FIELD

The present invention relates to a railway vehicle.

BACKGROUND ART

In a railway vehicle operated at a high speed such as Shinkansen (registered trademark), an airtight structure, which keeps the interior of the vehicle airtight such as a crew room and a common passenger room, is adopted in order to prevent a crew member or a passenger from feeling uncomfortable in hearing due to fluctuation in a vehicle interior pressure caused by fluctuation in a vehicle exterior pressure occurring when the vehicle passes through a tunnel at a high speed. More specifically, the railway vehicle is provided with a slidable side-sliding door, which is opened when a passenger or the like gets on and off the railway vehicle from and onto a station platform and is closed when the railway vehicle travels. When the railway vehicle travels at a predetermined speed or more, a peripheral edge of the closed side-sliding door is pressed toward a peripheral edge of an opening portion of a side structure forming a side surface of the railway vehicle to maintain airtightness.

Meanwhile, a leading vehicle includes a side hinged door for a crew member to get on and off a driving room, separately from the side-sliding door provided for the passenger or the like to get on and off the railway vehicle. The side hinged door is a door that rotates toward the interior of the driving room with a hinge provided at one vertical edge of the side hinged door as a fulcrum.

PTL 1 discloses a side hinged door device of a railway vehicle that travels at a high speed. This side hinged door device is a side-door opening device provided in a door opening portion leading to a conductor's room, and includes: an inward opening door main body mounted on a vehicle body by a hinge and configured to open or close the door opening portion leading to the conductor's room of the vehicle body; a handle configured to open or close the door main body; a latch interlocked with the handle; a switch configured to detect opening or closing of the door main body and output a signal; an inward opening window frame mounted on the door main body by a hinge and configured to open or close a window opening portion; an expandable seal rubber that is disposed on peripheral edge portions of the door opening portion of the vehicle body and the window opening portion of the door main body and abuts against peripheral edge portions of the door main body and the window frame of the window opening portion of the door main body; and a control valve installed on a vehicle body side and configured to open or close a circuit that supplies air to the expandable seal rubber. The circuit that supplies air to the expandable seal rubber is controlled by a signal of opening or closing the door main body and a speed signal of the vehicle.

CITATION LIST

Patent Literature

PTL 1: JP4673091B

SUMMARY OF INVENTION

Technical Problem

In the related art, a side hinged door in which an opening portion is provided in a side structure forming a side surface of a railway vehicle (crew room) includes an expandable seal rubber provided on an entire peripheral edge portion of the opening portion of the side structure in order to maintain airtightness when the side hinged door is closed, and includes a mechanism by which air is pumped into the expandable seal rubber when the railway vehicle travels at a predetermined speed or more.

A part of the expandable seal rubber expanded by the pumped air abuts against the entire peripheral edge portion of the side hinged door rotatably provided at the opening portion of the side structure via the hinge, and maintains the crew room airtight.

The side structure of the railway vehicle is assembled by welding or the like. Therefore, flatness of the peripheral edge portion of the opening portion provided in the side structure may not necessarily be secured due to a distortion or the like in association with welding or the like. Therefore, it is necessary to seal peripheries of a retainer that grips the expandable seal rubber and the peripheral edge portion of the side structure (opening portion) using a seal material.

In addition, since a part of the expandable seal rubber, which is expanded by the pumped air and abuts against the peripheral edge portion of the side hinged door, may be fixed to the peripheral edge portion of the side hinged door, there is a concern that a part of the expandable seal rubber fixed to the peripheral edge portion of the side-opening portion may fall off from the retainer.

An object of the invention is to provide a railway vehicle capable of constructing a highly reliable seal for a side hinged door with a small number of manufacturing steps.

Solution to Problem

In order to solve the above problems, a representative railway vehicle according to the invention includes: a side structure; an opening portion provided in the side structure; a side hinged door configured to close the opening portion; a door pillar provided on a vehicle interior side of a peripheral edge portion of the opening portion; a retainer provided on the door pillar; and an expandable seal rubber gripped by the retainer and expanded by pumped air, in which the retainer includes a seal damming portion protruding toward the opening portion and forming a space filled with a seal material between the seal damming portion and the door pillar.

Advantageous Effects of Invention

According to the invention, it is possible to provide a railway vehicle capable of constructing a highly reliable seal for a side hinged door with a small number of manufacturing steps.

Problems, configurations, and effects other than those described above will be apparent from the following description of embodiments.

DESCRIPTION OF EMBODIMENTS

Figure 1:
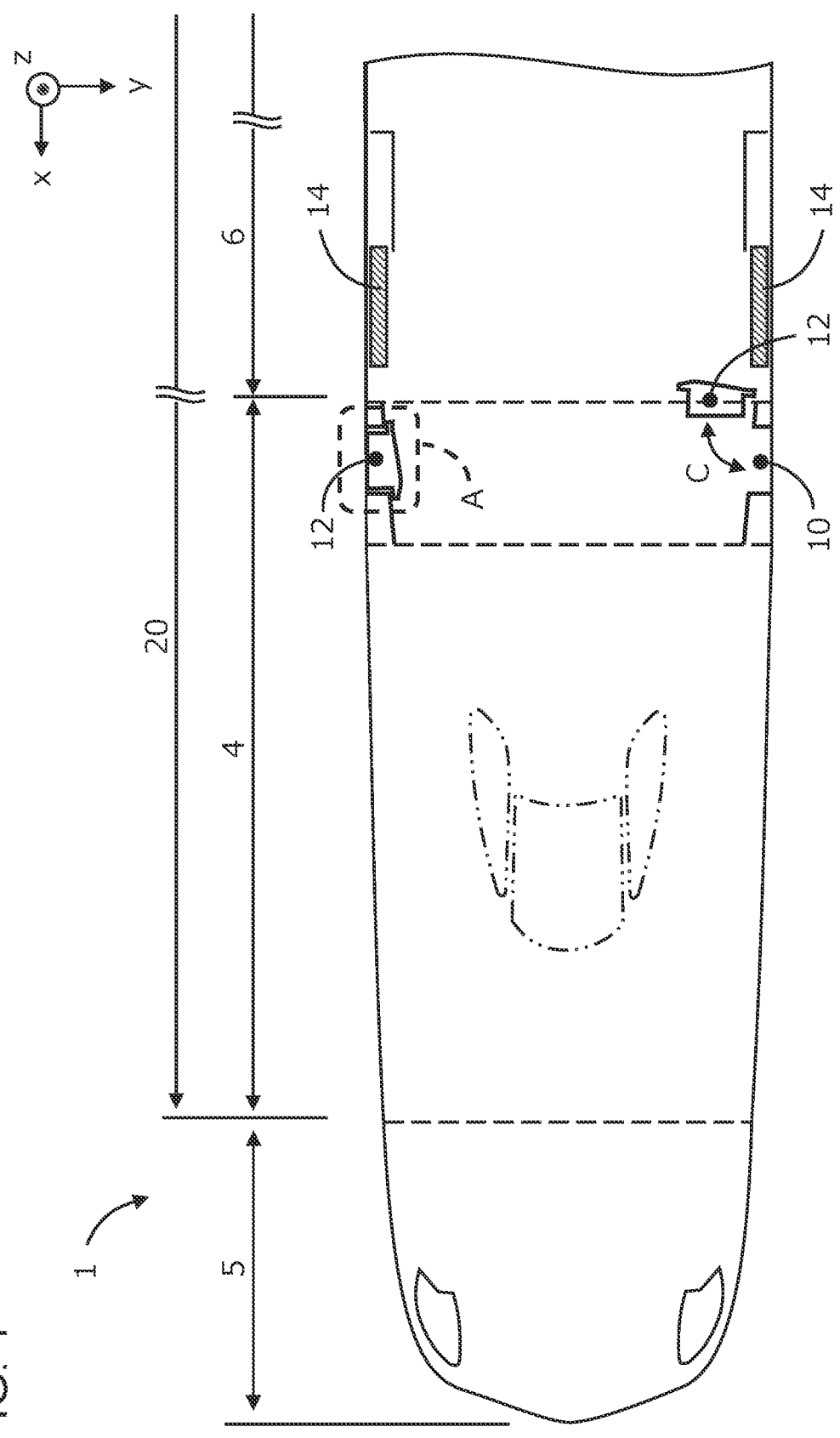
FIG. 1 is a cross-sectional view of a leading vehicle of a railway vehicle taken along a horizontal plane.

Hereinafter, an embodiment of the invention will be described with reference to the drawings. First, directions in the drawings are defined. A longitudinal (rail) direction of a leading vehicle is defined as an x direction, a width (sleeper) direction of the leading vehicle is defined as a y direction, and a height direction of the leading vehicle intersecting the x direction and the y direction is defined as a z direction. Hereinafter, the directions may be referred to as the x direction, the y direction, and the z direction.

FIG. 1 is a cross-sectional view of the leading vehicle of a railway vehicle taken along a horizontal plane. A leading vehicle 1 includes an underframe forming a floor surface, side structures 20 erected on both end portions of the underframe in the y direction, a roof structure placed on upper end portions of the side structures 20, and an end structure erected on one end portion of the underframe in the x direction. On the other end portion of the underframe in the x direction, a leading portion having a three-dimensional shape in which a cross-sectional shape intersecting the x direction along the x direction is continuously changed is provided. The leading portion includes a driver seat (a part of a crew room 4), an identification light (a headlight or the like), a coupler, and the like.

The leading vehicle 1 includes a front end portion 5, the crew room 4 that follows the front end portion 5, and a common passenger room 6 that follows the crew room 4. Each of the side structures 20 that separate the crew room 4 from the outside includes a crew entrance (also referred to as an opening portion) 10 through which a crew member gets on and off the railway vehicle, and the crew entrance 10 includes an inward opening side hinged door 12 that rotates in a direction of an arrow C around an axis in the z direction. Similarly, each of the side structures 20 that separates common passenger room from the outside includes an opening portion through which a passenger or the like gets on and off the railway vehicle, and the opening portion includes a side-sliding door 14 that slides along the x direction.

Figure 2:
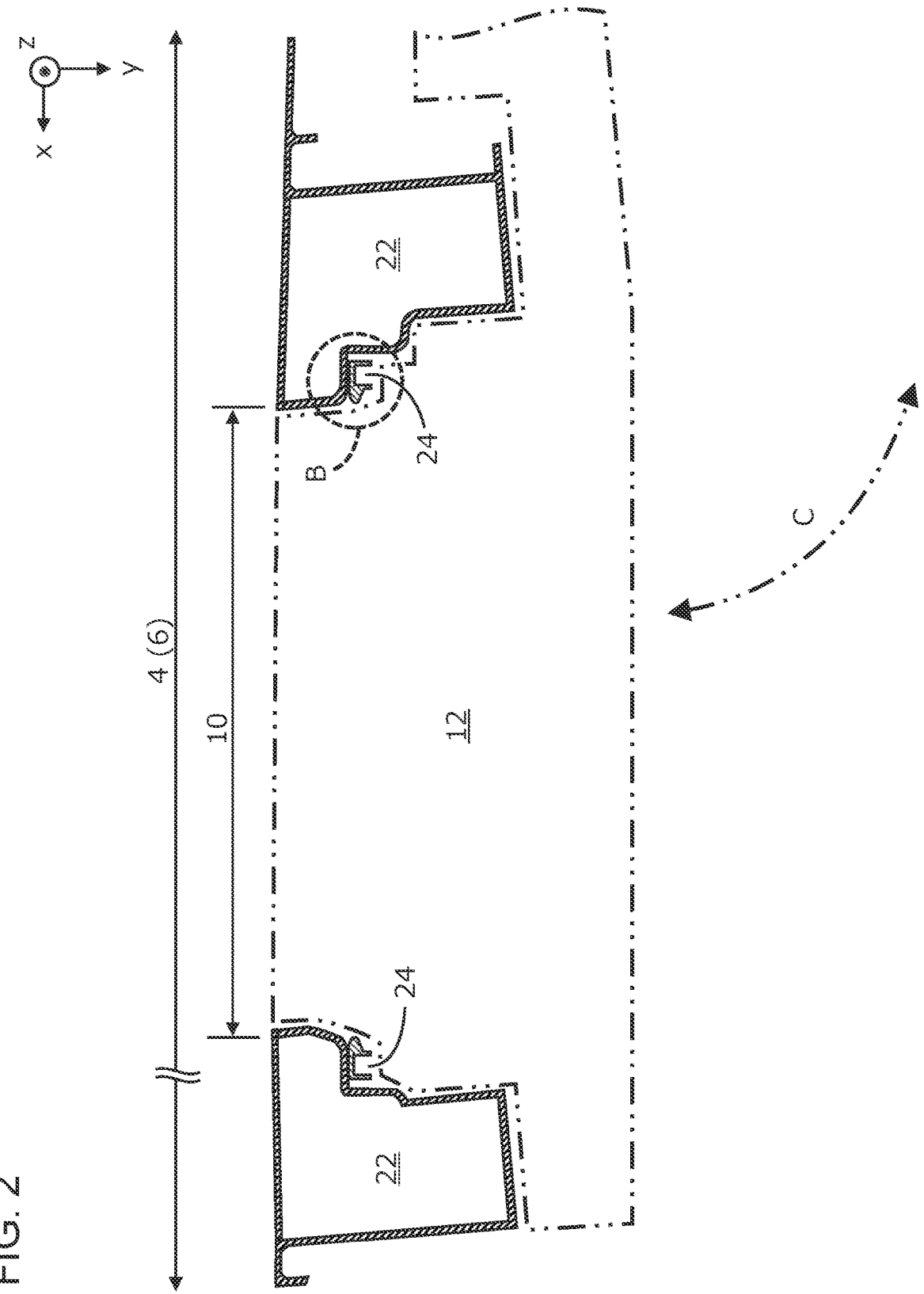
FIG. 2 is a cross-sectional view (an enlarged view of a portion A in FIG. 1) intersecting a height direction of a side hinged door provided for a crew room of the leading vehicle.

FIG. 2 is a cross-sectional view (an enlarged view of a portion A in FIG. 1) intersecting a height direction of the side hinged door provided for the crew room of the leading vehicle. The side hinged door 12 whose outer shape is indicated by two-dot chain lines is a hinged door that rotates toward a vehicle interior side of the crew room, and a rotation shaft of the side hinged door 12 is provided in the vicinity of a door pillar 22 that is provided in parallel with the side structure 20 along the z-axis direction. When the side hinged door 12 closes the crew entrance 10, a part of the side hinged door 12 forms the same surface with the side structure 20, and prevents turbulence of air flowing along a vehicle exterior side surface of the leading vehicle.

Figure 3:
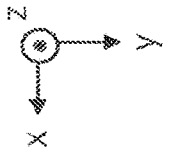
FIG. 3 is a cross-sectional view (an enlarged view of a portion B in FIG. 2) in a height direction of an airtight mechanism (at the time of opening) provided between a door pillar and a side hinged door that are provided in a side structure of the leading vehicle.
Figure 4:
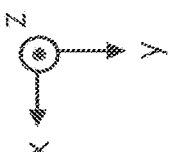
FIG. 4 is a cross-sectional view (an enlarged view of the portion B in FIG. 2) in the height direction of the airtight mechanism (at the time of closing) provided between the door pillar and the side hinged door that are provided in the side structure of the leading vehicle.
Figure 5:
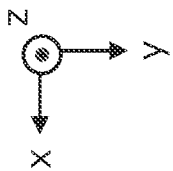
FIG. 5 is a cross-sectional view of a retainer, which grips an expandable seal rubber forming the airtight mechanism, intersecting a height direction of the retainer.
Figure 5:
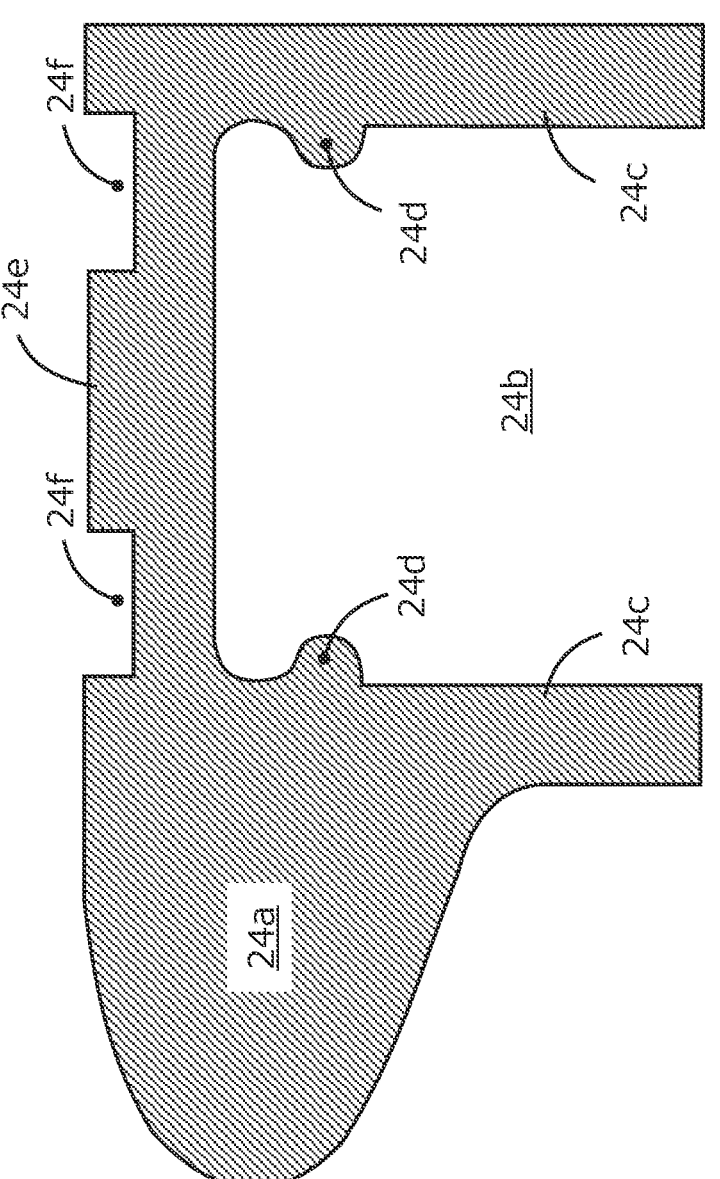

FIG. 3 is a cross-sectional view (an enlarged view of a portion B in FIG. 2) in a height direction of an airtight mechanism (at the time of opening) provided between the door pillar and the side hinged door that are provided in the side structure of the leading vehicle, and FIG. 4 is a cross-sectional view (an enlarged view of the portion B in FIG. 2) in the height direction of the airtight mechanism (at the time of closing) provided between the door pillar and the side hinged door that are provided in the side structure of the leading vehicle. FIG. 5 is a cross-sectional view of a retainer, which grips an expandable seal rubber forming the airtight mechanism, intersecting a height direction of the retainer.

The door pillar 22 includes a door pillar inclined portion 22s from the side structure 20 (FIG. 1) toward the vehicle interior side of the crew room 4 (provided substantially along the y direction), and a door pillar parallel portion 22h connected to the door pillar inclined portion 22s and extending along the x direction. In a state in which the side hinged door 12 is closed, the door pillar parallel portion 22h faces a side hinged door parallel portion 12h provided at an outer edge portion of the side hinged door 12.

The door pillar parallel portion 22h includes a retainer 24 provided along the z direction, and the retainer 24 holds an expandable seal rubber 25. When the railway vehicle (the leading vehicle 1) travels at a predetermined speed or more, air is press-fitted into the expandable seal rubber 25, and the expandable seal rubber 25 is guided by a pair of seal rubber gripping portions 24c (FIG. 5) of the retainer 24 to expand in the y direction. The expanded expandable seal rubber 25 abuts against the side hinged door parallel portion 12h and reliably seals a gap between the side structure 20 (including the door pillar 22) and the side hinged door 12. Hereinafter, the expandable seal rubber 25 is simply referred to as a seal rubber 25.

The retainer 24 is fixed to the door pillar 22 (the door pillar parallel portion 22h) by screws 26 via a liner 27 that adjusts a mounting dimension in the y direction on a vehicle interior side of the door pillar parallel portion 22h of the door pillar 22 connected to the side structure 20. Since the screws 26 are discretely provided along the z direction, it is necessary to fill minute (local) gaps between the door pillar 22 (the door pillar parallel portion 22h), the liner 27, and the retainer 24 positioned between one screw 26 and another screw 26. Therefore, in order to improve airtightness and prevent entry of rainwater or the like, sealing is achieved by providing seal portions 40a, 40b, and 40c along a longitudinal direction (the z direction) of the retainer 24.

When the railway vehicle traveling at a high speed passes through a tunnel, air inside the tunnel is compressed by the railway vehicle that rushes into the tunnel, and a compressed wave that propagates at a sound velocity in a traveling direction of the railway vehicle is generated. A phase of the compressed wave is inverted at an exit of the tunnel to become an expanded wave, and the expanded wave propagates in the tunnel toward an entrance of the tunnel. Therefore, a vehicle exterior pressure of the railway vehicle passing through the tunnel greatly fluctuates to a plus side of the compressed wave or a minus side of the expanded wave with respect to an atmospheric pressure in a short time.

In addition to the side-sliding door 14 provided for the passenger or the like to get on and off the railway vehicle, the leading vehicle including the side hinged door 12 for the crew member to get on and off the railway vehicle includes several opening portions in the side structure 20. Therefore, it is necessary to improve sealing performance between a peripheral edge portion of the side hinged door 12 and a peripheral edge portion of the crew entrance 10 and maintain the airtightness such that rainwater or the like does not enter the crew room 4 or air does not enter or exit from between the peripheral edge portion of the crew entrance 10 and a peripheral edge portion of the side hinged door 12 due to fluctuation of the vehicle exterior pressure.

The seals that contribute to maintaining the airtightness includes: the seal portion 40*a* that crosses over a seal damming portion 24*a* of the retainer 24, one side surface of the liner 27, and the door pillar 22; the seal portion 40*b* that crosses over a bottom portion 24*e* (FIG. 5) of the retainer 24 and a surface of the liner 27 on a side opposite to a door pillar 22 side; and the seal portion 40*c* that crosses over a side surface of the retainer 24, the other side surface of the liner 27, and the door pillar 22.

<Seal Configuration>

As shown in FIG. 5, a seal rubber accommodating portion 24*b* of the retainer 24 that grips the seal rubber 25 has a groove shape including the bottom portion 24*e* and the pair of seal rubber gripping portions 24*c* connected to both end portions of the bottom portion 24*e* in the x direction and erected in the y direction. One of the seal rubber gripping portions 24*c* includes the seal damming portion 24*a* in a manner of protruding in the x direction. A space (recessed indent) filled with a seal material is formed between the seal damming portion 24*a* and the door pillar 22.

When the retainer 24 is fixed to the door pillar parallel portion 22*h*, a seal damming portion front end portion 24*ap* is positioned in the vicinity of a virtual extended plane 22*sp* (FIG. 3) as an extension of the door pillar inclined portion 22*s* of the door pillar 22 at a side hinged door 12 side. The seal damming portion 24*a* protruding toward a crew entrance 10 side may be implemented by a separate component from the retainer 24 and then connected to the seal rubber gripping portion 24*c* of the retainer 24, or may be integrally provided with one seal rubber gripping portion 24*c* of the retainer 24 as shown in FIG. 5. In the case of being integrally provided, the seal damming portion 24*a* and the seal rubber gripping portion 24*c* may be formed of an extruded shape material made of an aluminum alloy and extruded and molded along the z direction.

In the retainer 24, a pair of protruding portions 24*d* protruding in a manner of facing each other in the x direction are provided in the vicinity of connecting portions that connect the pair of seal rubber gripping portions 24*c* and the bottom portion 24*e*. Further, in the retainer 24, two recessed portions 24*f* (see FIG. 5) formed along the z direction are provided on a surface (a surface on the door pillar 22 side) of the bottom portion 24*e* on a side opposite to the seal rubber accommodating portion 24*b*.

As shown in FIG. 4, the seal rubber 25 accommodated in the retainer 24 includes a seal rubber bottom portion 25*e* and a body portion 25*g* connected to the seal rubber bottom portion 25*e*. In a space surrounded by the seal rubber bottom portion 25*e* and the body portion 25*g*, an air bag 25*a* into which high-pressure air is pumped when the railway vehicle travels at a predetermined speed or more is formed. A pair of seal rubber recessed portions 25*d* to which the protruding portions 24*d* of the retainer 24 are fitted are provided in the vicinity of connecting portions between the seal rubber bottom portion 25*e* and the body portion 25*g*.

<Seal Effects>

Since the retainer 24 includes the seal damming portion 24*a*, it is possible to omit an operation (arrangement) of preparing a separate member that dams the seal portion 40*a* and an operation of fixing the separate member. Therefore, it is possible to form the seal portion 40*a* that crosses over the seal damming portion 24*a* of the retainer 24, one side surface of the liner 27, and the door pillar 22 with a small number of manufacturing steps.

Further, when the retainer 24 is fixed to the door pillar parallel portion 22*h*, the seal damming portion front end portion 24*ap* is positioned in the vicinity of the virtual extended plane 22*sp* as an extension of the door pillar inclined portion 22*s* of the door pillar 22 at the side hinged door 12 side. Therefore, when the seal portion 40*a* is constructed, when a spatula that molds a fluid seal material is moved along the z direction in a manner of crossing over the door pillar inclined portion 22*s* and the seal damming portion front end portion 24*ap*, the seal material can be pushed into the indent in a short time to fill the indent and can be molded accurately in a shape along the door pillar inclined portion 22*s*.

Further, since the recessed portions 24*f* that hold the seal material are provided in the bottom portion 24*e* of the retainer 24, by mounting the retainer 24 on the liner 27 after filling the recessed portions 24*f* with the seal material, it is possible to easily form the seal portion 40*b* that seals between the bottom portion 24*e* of the retainer 24 and the surface of the liner 27 on the side opposite to the door pillar 22 (the door pillar parallel portion 22*h*) side.

Further, since the retainer 24 includes the seal rubber gripping portion 24*c*, the seal portion 40*c* can be easily formed to cross over a side surface of the seal rubber gripping portion 24*c*, the other side surface of the liner 27, and the door pillar 22 by using the spatula or the like.

With the above configuration, the seal portions 40*a*, 40*b*, and 40*c* can be formed between the door pillar 22 and the retainer 24 with a small number of work hours. Accordingly, it is possible to maintain airtightness and watertightness between the side hinged door 12 of the leading vehicle 1 and the crew entrance of the side structure 20, and in particular, it is possible to more reliably prevent entry of rainwater or the like and entry or exit of air through a path as indicated by an arrow D.

In addition, since the retainer 24 that grips the seal rubber 25 is provided with the protruding portions 24*d*, by providing the seal rubber 25 with the seal rubber recessed portions 25*d* to which the protruding portions 24*d* are fitted, it is possible to reliably maintain a state in which the seal rubber 25 is gripped by the retainer 24 even when air is pumped into the air bag 25*a* of the seal rubber 25 to expand the seal rubber 25.

Therefore, even in an unlikely event that an abutting portion 25*b* of the seal rubber 25 comes into close contact with the side hinged door 12 with a high pressure, the seal rubber 25 can be prevented from falling off from the retainer 24 even when the abutting portion 25*b* is fixed to the side hinged door 12.

Therefore, it is possible to provide a railway vehicle including a side hinged door including an expandable seal rubber, in which a reliable seal can be provided between a retainer that grips the expandable seal rubber and a peripheral edge of an opening portion of a side structure with a small number of manufacturing steps and a highly reliable seal can be provided such that the expandable seal rubber is less likely to fall off from the retainer even when the expandable seal rubber is fixed to a peripheral edge portion of the side hinged door.

REFERENCE SIGNS LIST

1: leading vehicle
4: crew room
5: front end portion
6: common passenger room
10: crew entrance (opening portion)
12: side hinged door (for crew)
12*h*: side hinged door parallel portion
14: side-sliding door (for passenger)
20: side structure
22: door pillar
22*s*: door pillar inclined portion
22*sp*: virtual extended plane
22*h*: door pillar parallel portion
24: retainer
24*a*: seal damming portion
24*ap*: seal damming portion front end portion
24*b*: seal rubber accommodating portion
24*c*: seal rubber gripping portion
24*d*: protruding portion
24*dp*: protruding portion front end portion
24*e*: bottom portion
24*f*: recessed portion
25: seal rubber
25*a*: air bag
25*b*: abutting portion
25*d*: seal rubber recessed portion
25*e*: seal rubber bottom portion
25*g*: body portion
26: screw
27: liner
40*a* to 40*c*: seal portion
C: arrow indicating opening or closing direction
D: arrow indicating entry path of air, rainwater, or the like
x: longitudinal (rail) direction
y: width (sleeper) direction
z: height direction

What is claimed is:

1. A railway vehicle comprising:
a side structure;
an opening portion provided in the side structure;
a side hinged door configured to close the opening portion;
a door pillar provided on a vehicle interior side of a peripheral edge portion of the opening portion;
a retainer provided on the door pillar; and
an expandable seal rubber gripped by the retainer and expanded by pumped air,
wherein the retainer includes a seal damming portion protruding toward the opening portion and forming a space filled with a seal material between the seal damming portion and the door pillar, wherein the door pillar includes:
a door pillar inclined portion along a substantially width direction of the railway vehicle; and
a door pillar parallel portion connected to the door pillar inclined portion and extending along a longitudinal direction of the railway vehicle,
wherein the retainer is fixed to the door pillar parallel portion,
wherein a seal portion that seals between the door pillar inclined portion and the seal damming portion is provided,
wherein the retainer includes:
a bottom portion fixed to the door pillar parallel portion;
a pair of seal rubber gripping portions connected to both end portions of the bottom portion in the longitudinal direction of the railway vehicle and erected in a width direction of the railway vehicle; and
a pair of protruding portions protruding from the seal rubber gripping portions in the vicinity of the bottom portion so as to face each other along the longitudinal direction of the railway vehicle, and
wherein the seal damming portion is connected to one of the seal rubber gripping portions.

2. The railway vehicle according to claim 1, wherein the expandable seal rubber includes:
a seal rubber bottom portion;
a body portion connected to the seal rubber bottom portion;
an air bag including the seal rubber bottom portion and the body portion; and
a pair of seal rubber recessed portions in the vicinity of connecting portions between the seal rubber bottom portion and the body portion, and
the expandable seal rubber is gripped by the retainer in a manner such that the seal rubber recessed portion is fitted to the protruding portion of the retainer.

3. The railway vehicle according to claim 1, wherein the retainer is coupled to the door pillar via a liner.

4. The railway vehicle according to claim 3, wherein a seal portion is formed to cross over the door pillar, the liner, and the seal damming portion.

5. The railway vehicle according to claim 3, wherein the retainer includes a recessed portion facing the liner, and a seal portion is formed between the recessed portion and the liner.

6. The railway vehicle according to claim 1, wherein the retainer is coupled to the door pillar via a liner, and a seal portion is formed to cross over the door pillar, the liner, and the seal rubber gripping portion.

7. The railway vehicle according to claim 1, wherein the retainer is formed of an extruded shape material.

* * * * *